(12) United States Patent
Nemoto et al.

(10) Patent No.: US 9,537,755 B2
(45) Date of Patent: *Jan. 3, 2017

(54) ACCESS RELAY METHOD AND ACCESS GATEWAY DEVICE

(71) Applicant: Hitachi, Ltd., Tokyo (JP)

(72) Inventors: Naokazu Nemoto, Kawasaki (JP); Kunihiko Toumura, Hachioji (JP); Naoki Haraguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 14/600,545

(22) Filed: Jan. 20, 2015

(65) Prior Publication Data

US 2015/0134849 A1    May 14, 2015

Related U.S. Application Data

(63) Continuation of application No. 13/567,612, filed on Aug. 8, 2012, now Pat. No. 8,938,794.

(30) Foreign Application Priority Data

Oct. 17, 2011 (JP) .................. 2011-227724

(51) Int. Cl.
*H04L 29/06* (2006.01)
*H04L 12/701* (2013.01)
*H04L 12/721* (2013.01)

(52) U.S. Cl.
CPC .............. *H04L 45/14* (2013.01); *H04L 45/00* (2013.01); *H04L 63/02* (2013.01); *H04L 67/42* (2013.01)

(58) Field of Classification Search
CPC .......... H04L 45/14; H04L 67/42; H04L 45/00; H04L 63/02
See application file for complete search history.

(56) References Cited

U.S. PATENT DOCUMENTS

| 6,798,788 | B1 | 9/2004 | Viswanath et al. |
| 7,088,718 | B1 | 8/2006 | Srivastava |
| 7,139,837 | B1 * | 11/2006 | Parekh ................... H04L 45/48 709/238 |
| 8,064,445 | B2 | 11/2011 | Okubo et al. |

(Continued)

FOREIGN PATENT DOCUMENTS

| JP | 2006-174374 A | 6/2006 |
| JP | 2008-311909 A | 12/2008 |
| JP | 2010-183421 | 8/2010 |

OTHER PUBLICATIONS

Translation of JP 2008-311909 dated Dec. 25, 2008; 21 pages.
English nquage machine translation of p. 2008-311909 dated Dec. 25, 2008; 21 pages.

*Primary Examiner* — Matthew Smithers
(74) *Attorney, Agent, or Firm* — Foley & Lardner LLP

(57) ABSTRACT

A gateway device disposed at front stage before a server has a dispersion rule of data dispersed on server side and analyzes communication data to specify a server to be accessed finally, so that identification information of the specified server is added to packet option of IP layer to thereby omit higher-rank routing processing than IP layer of gateway devices on the way. Consequently, transfer processing of a gateway device at back stage can be performed at high speed and access passing through a network route intended by manager is possible.

15 Claims, 17 Drawing Sheets

(56) References Cited

U.S. PATENT DOCUMENTS

| | | |
|---|---|---|
| 8,938,794 B2 * | 1/2015 | Nemoto .......................... 726/12 |
| 2002/0191254 A1 | 12/2002 | Mays, Jr. |
| 2004/0153570 A1 | 8/2004 | Shobatake |
| 2004/0165581 A1 | 8/2004 | Oogushi |
| 2006/0133371 A1 | 6/2006 | Matoba |
| 2009/0252136 A1 | 10/2009 | Mahany et al. |
| 2010/0034083 A1 * | 2/2010 | Prakash ................ H04W 28/18 370/230.1 |
| 2010/0202343 A1 | 8/2010 | Hunzinger et al. |
| 2011/0080835 A1 * | 4/2011 | Malomsoky .......... H04L 43/026 370/241 |
| 2011/0119550 A1 * | 5/2011 | Fantaske ............... H04L 1/0002 714/748 |
| 2011/0246669 A1 * | 10/2011 | Kanada ................ G06F 9/4856 709/238 |

\* cited by examiner

FIG.6

| CLASSIFICATION | DISPERSION RULE | LEVEL |
|---|---|---|
| SERVER | HashR1 | 4 |
| ... | ... | ... |

| TERMINAL IDENTIFICATION INFORMATION |
|---|
| Company_X |
| ... |

| IDENTIFIER | ADDRESS |
|---|---|
| Hash_X1 | 192.168.0.10 |
| ... | ... |

| IDENTIFIER | ADDRESS |
|---|---|
| Hash_Z1 | 192.168.3.3 |
| ... | ... |

2001 / 2002 / 415c

ACCESS RELAY METHOD AND ACCESS GATEWAY DEVICE

INCORPORATION BY REFERENCE

This application is a Continuation of U.S. application Ser. No. 13/567,612, filed Aug. 6, 2012, which claims priority based on Japanese patent application, No. 2011-227724 filed on Oct. 17, 2011, the entire contents of which are incorporated herein by reference.

BACKGROUND

The subject matter disclosed in the present specification relates to plural gateway devices which are installed in servers or in communication paths between terminals and the servers in a network system for communicating data between the servers and the terminals, such as the WWW (World Wide Web), a mail system and a data center.

Client terminals access servers coupled to LAN (Local Area Network) or WAN (Wide Area Network) through a lot of gateway devices such as switches, firewalls and gateways. Particularly, when clients such as mobile phone terminals access servers, an extremely large number of terminals access the servers through gateways. With the spread of terminals coupled to wired network and wireless network, high function of recent mobile phone terminals, high-speed operation of wireless communication network and a large capacity of contents such as animation and music, the amount of data exchanged between servers and clients in WWW or the like is increased. Further, the amount of communication is increased with reduction of data communication time due to increased capacity of communication band of wired network and wireless network and increased size of contents.

The amount of communication passing through gateway devices such as switches, firewalls and gateways in a data center system and a mobile phone operator system, or a telecommunication carrier system, is greatly expanded and is being increased. It is urgently required to reinforce the processing capability of gateways and servers due to such increased communication amount. As measures of reinforcing the capability, there are a method of improving hardware performance and a method of processing requests dispersedly.

Generally, the former is named scale-up and the latter is named scale-out. The measures using the scale-up have problems such as stop of service due to single defective point and stop of service upon update of hardware. A lot of mobile phone operators, or telecommunication carriers, and data center operation companies having large-scale system reinforce the capability of scale-out type capable of coping with increased communication amount without stopping service.

On the other hand, in order to attain high-speed responses to access requests from clients, servers have the data grid structure which utilizes high-speed access performance of a semiconductor memory to store data therein and makes responses instead of reading out data stored in a hard-disk to make responses. In the system constituted of plural servers utilizing the data grid structure, duplication and management of data between servers are performed by protocol having high scalability for securement of system reliability. In such a system, even if a request is issued to any server, the request is transferred to a server having data and accordingly target data can be accessed.

Such a system has a merit that the party that accesses data is not required to consciously consider where data is located. On the other hand, transfer of a request between servers in which data are provided occurs and there is a case where a response of system is delayed.

Moreover, as the system is more large-scale, data communication through plural gateway devices is also increased. Analysis is sometimes made until a high-rank layer according to kinds of gateway devices and transfer processing (latency as viewed from client terminals) of communication data possibly takes time.

Technique for solving the above problem is disclosed in JP-A-2010-183421. In this technique disclosed in this publication, when switches are provided at front and back stages in communication made through plural gateway devices, retrieval speed for retrieval table is improved when the switch at front stage makes routing by the switch at back stage, so that high-speed operation is realized.

SUMMARY

However, it is indispensable that analysis is made until a high-rank layer in both the switches at front and back stages and since analysis processing takes time, it is considered that there arises a problem that transfer speed is not improved as follows.
(1) Header information of layer 3 is analyzed in all the switches and accordingly it is considered that analysis load is increased and packet transfer takes time.
(2) Since the switch at back stage makes routing without grasping circumstances in a transfer destination, a server at transfer destination does not sometimes include data to be processed and it cannot be prevented that superfluous step such as transfer processing between servers occurs.

In the present specification, disclosed is an access relay method using analysis information of a gateway device at front stage to be able to make a gateway device at back stage route a message to a proper server and perform transfer processing of the gateway device at back stage at high speed.

In order to solve the above problems, according to the disclosed access relay method, a gateway device disposed at front stage before server has a dispersion rule of data dispersed on the server side and analyzes communication data to specify a server to be accessed finally and identification information of the specified server is added to packet option of IP layer to omit higher-rank routing processing than IP layer of gateway devices on the way.

According to the disclosures, communication can be directly made to a server having data to be accessed from among plural servers to shorten the latency. Further, communication can be realized through an intended network route when plural gateway devices are coupled according to a provision method of rule.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 shows an example of a table provided in gateway devices, switches and server devices and in which dispersion rules are registered.

FIG. 7 shows an example of a table provided in firewall devices and in which terminal identification information of client terminals is registered.

FIG. 8 shows an example of a table provided in switches and in which IP addresses of gateway devices of distribution destination are registered.

DETAILED DESCRIPTION OF THE EMBODIMENTS

Embodiments are now described with reference to the accompanying drawings.

Embodiment 1

A computer system of the embodiment includes client terminals, firewall devices, gateway devices, switches and server devices coupled through networks.

Figure 1:
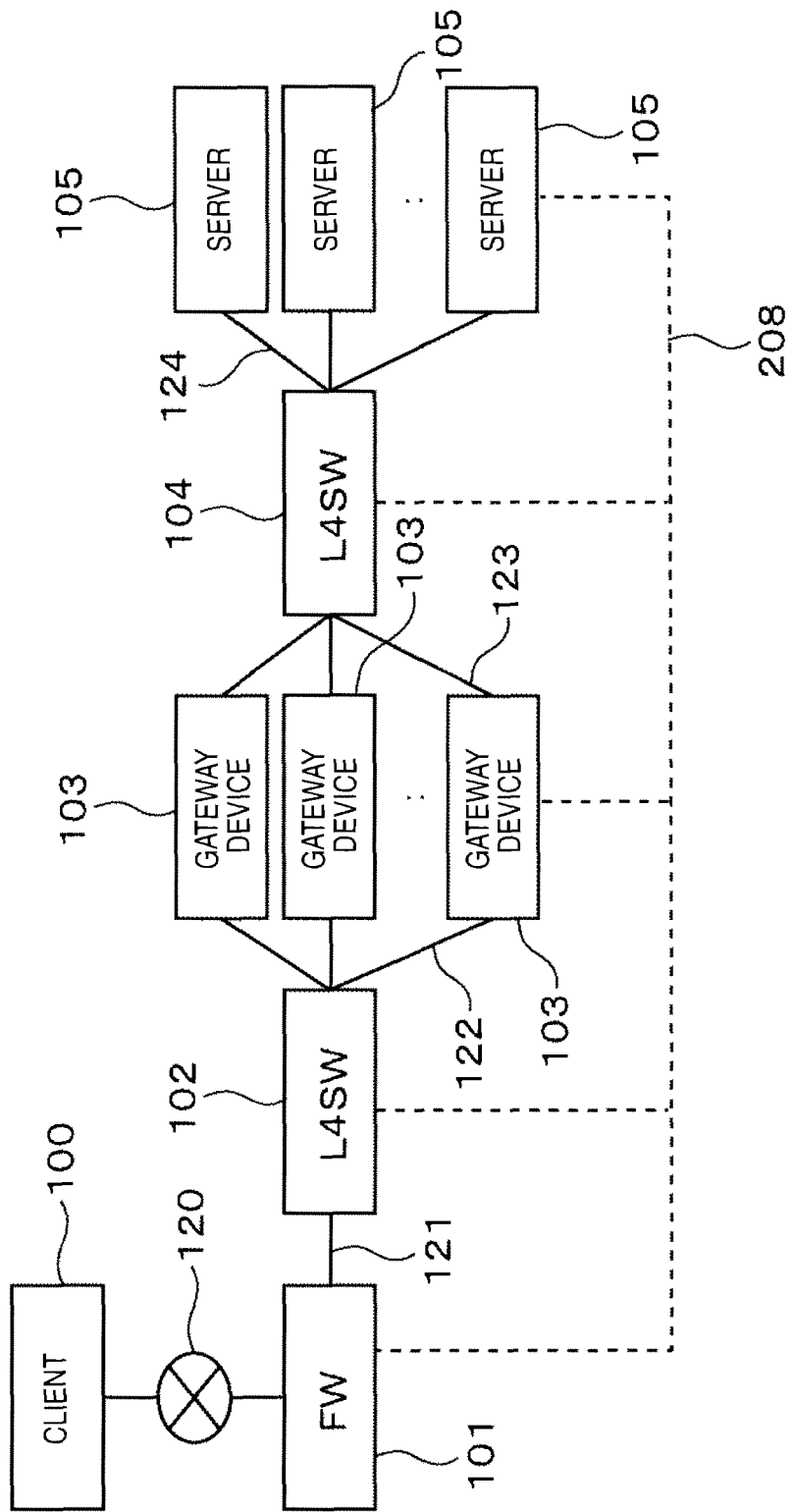
FIG. 1 shows a block diagram schematically illustrating an example of a computer system.

FIG. 1 schematically illustrates the computer system. One or more firewall devices (hereinafter abbreviated to FW) 101 are coupled to a client terminal (hereinafter referred to as client) 100 through a network 120. Further, the FW is coupled to a switch (L4SW) 102 through a network 121. The switch 102 is coupled to plural gateway devices 103 through a network 122.

The gateway devices 103 are coupled through a network 123 to a switch (L4SW) 104 (in order to distinguish the switches 102 and 104, hereinafter the former is named the switch at front stage and the latter is named the switch at back stage). The switch 104 at back stage is coupled through a network 124 to server devices 105 (hereinafter referred to as servers). The FW 101, the switch 102 at front stage, the gateway devices 103, the switch 104 at back stage and the servers 105 are coupled through a network 208 to one another.

In the embodiment, FW 101, the switch 102 at front stage, the gateway devices 103, the switch 104 at back stage and the servers 105 are coupled through different networks, although they may be coupled through the same network.

(Configuration of Devices)

Figure 2:
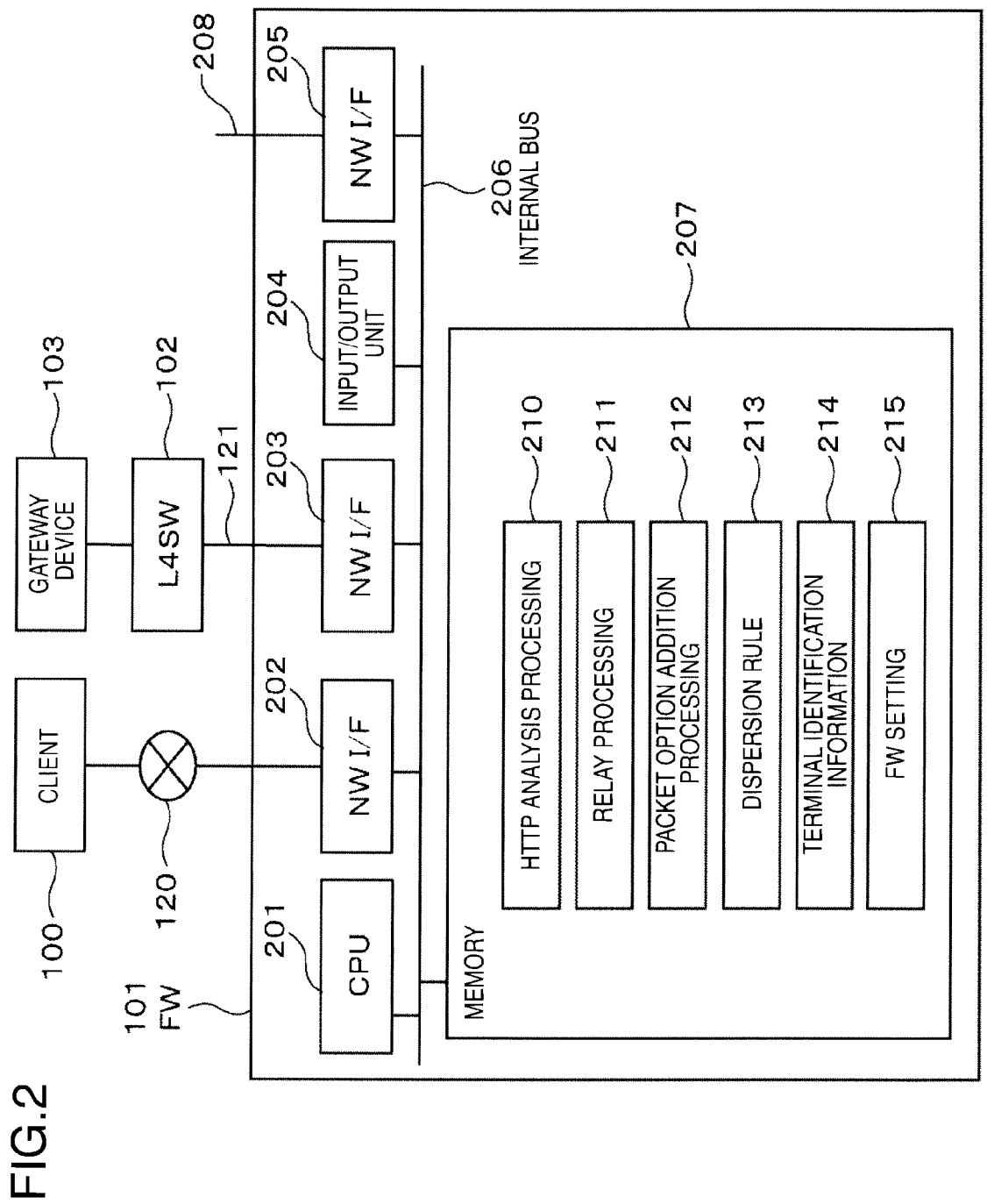
FIG. 2 shows a block diagram schematically illustrating an example of a firewall device.

FIG. 2 schematically illustrates an example of the FW. The FW 101 includes one or more CPU's 201, one or more network interfaces (NW I/F) 202 to 203 and 205, an input/output unit 204 and a memory 207 coupled through a communication path 206 such as internal bus mutually and is realized by a computer. The NW I/F 202 is coupled to the client 100 through a network 120. The NW I/F 203 is coupled to the switch 102 at front stage through a network 121. The NW I/F 205 is coupled to the server 105 through the network 208.

Programs executed by the CPU 201 to realize HTTP analysis processing 210, relay processing 211 and packet option addition processing 212, a dispersion rule 213, terminal identification information 214 and FW setting information 215 are stored in the memory 207. The HTTP analysis processing 210 performs analysis when an HTTP request is received from the client 100. Relay processing 211 performs processing for deciding whether the request from client 100 is received or not on the basis of the FW setting information 215 and for transferring the request to the gateway device 103 after being subjected to the HTTP analysis processing 210 when the request can be received.

Figure 3:
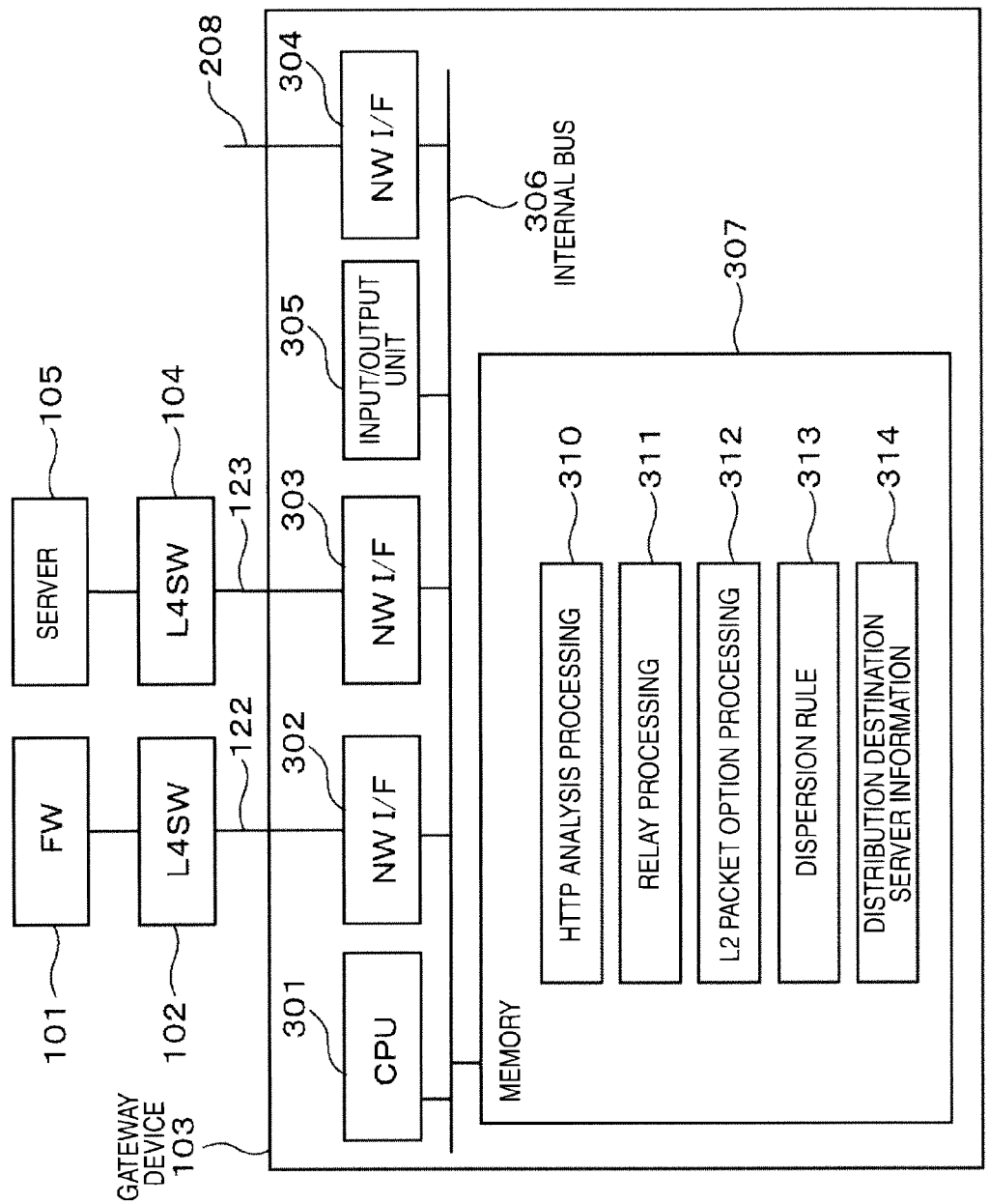
FIG. 3 shows a block diagram schematically illustrating an example of a gateway device.

FIG. 3 schematically illustrates an example of the gateway device. The gateway device 103 includes one or more CPU 301, one or more NW I/F 302 to 304, an input/output unit 305 and memory 307 coupled through a communication path 306 such as internal bus and is realized by a computer.

The NW I/F 302 is coupled to the switch 102 at front stage through the network 122. The NW I/F 303 is coupled to the switch 104 at back stage through the network 123. The NW I/F 304 is coupled to the server 105 through the network 208 mutually.

Programs executed by the CPU 301 to realize HTTP analysis processing 310, relay processing 311 and L2 packet option processing 312, a dispersion rule 313 and distribution destination server information 314 are stored in the memory 307. The HTTP analysis processing 310 performs analysis when an HTTP request is received from the client 100. The relay processing 311 relays communication between the client 100 and the server 105 on the basis of analysis result of the HTTP analysis processing 310.

Figure 4:
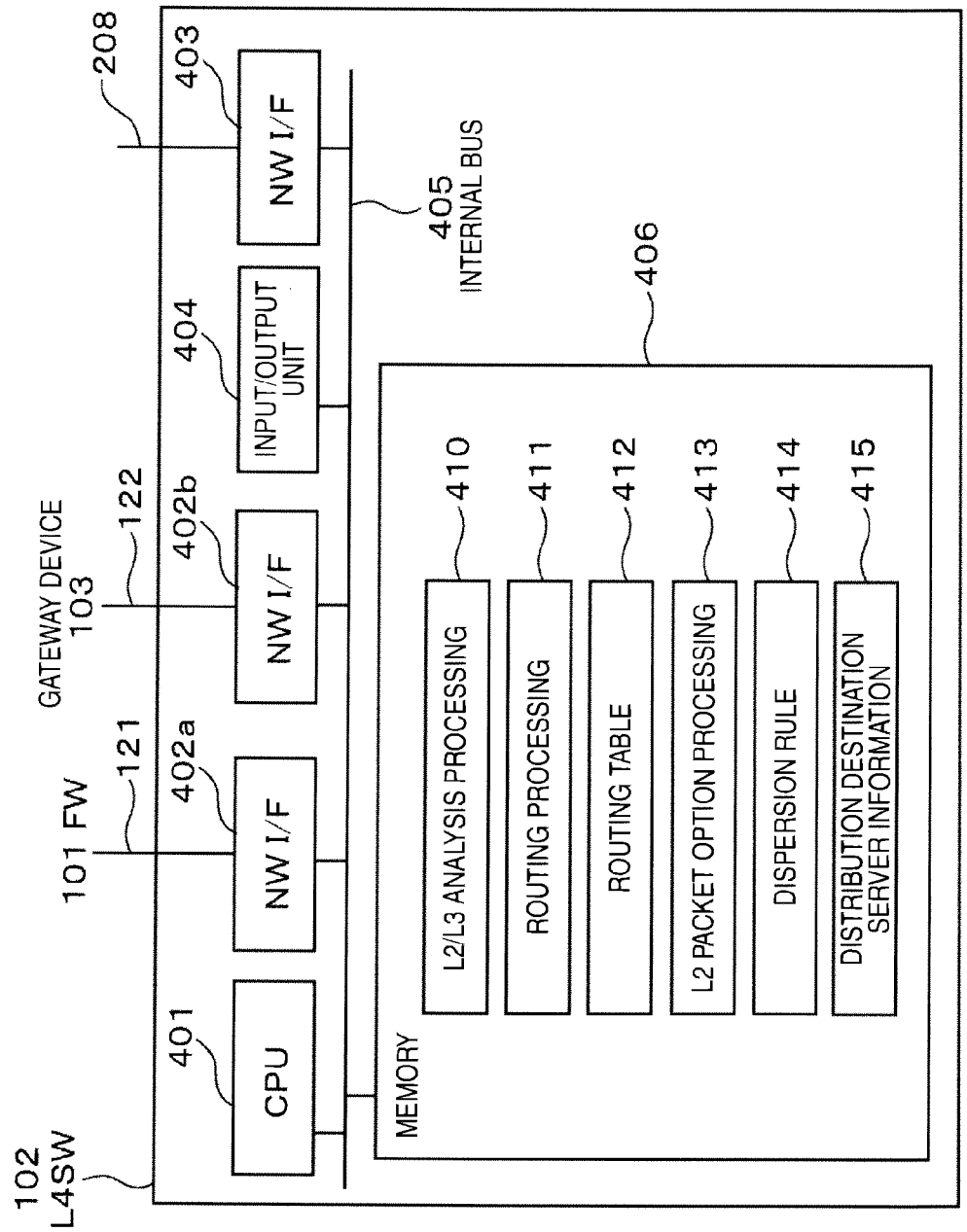
FIG. 4 shows a block diagram schematically illustrating an example of a switch.

FIG. 4 schematically illustrates an example of the switch at front stage. The switch 102 at front stage includes one or more CPU 401, one or more NW I/F 402 to 403, an input/output unit 404 and a memory 406 coupled through a communication path 405 such as internal bus mutually and is realized by a computer. The NW I/F 402a is coupled to the FW 101 through the network 121. The NW I/F 402b is coupled to the gateway device 103 through the network 122. The NW I/F 205 is coupled to the server 105 through the network 208 mutually.

Programs to be executed by the CPU 401 to realize L2/L3 analysis processing 410, routing processing 411 and L2 packet option processing 413, a routing table 412, a dispersion rule 414 and distribution destination server information 415 are stored in the memory 406. The L2/L3 analysis processing 410 analyzes packets received through the NW I/F 402a or 402b in layer 2 or 3. The routing processing 411 performs packet relay processing in accordance with a rule of routing table 412 on the basis of result analyzed by the L2/L3 analysis processing 410.

The switches 102 and 104 at front and back stages have the same configuration. Accordingly, the drawing for illustrating an example of configuration of the switch 104 at back stage is omitted.

Figure 5:
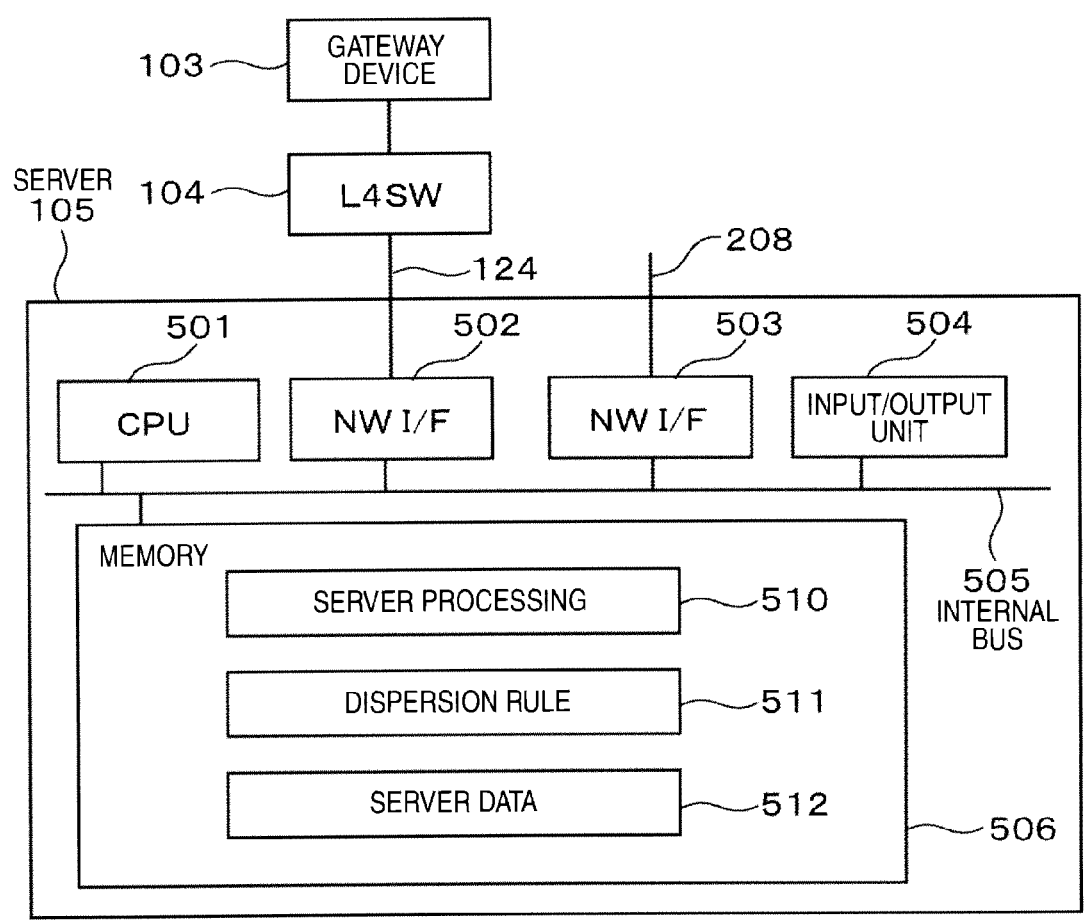
FIG. 5 shows a block diagram schematically illustrating an example of a server device.

FIG. 5 schematically illustrates an example of the server. The server 105 includes one or more CPU 501, one or more NW I/F 502 to 503, an input/output unit 504 and a memory 506 coupled through a communication path 505 such as internal bus mutually and is realized by a computer.

The NW I/F 502 is coupled to the gateway device 103 through the network 124. The NW I/F 503 is coupled through the network 208 to the FW 101, the switch 102 at front stage, the gateway devices 103 and the switch 104 at back stage mutually. Programs executed by the CPU 501 to realize server processing 510, dispersion rule 511 and server data 512 are stored in the memory 506.

The server processing 510 is a program for WWW server and the like in the embodiment. Server data 512 is data provided by the server 105 in response to a request from the client.

(Table Structure)

Figure 9:
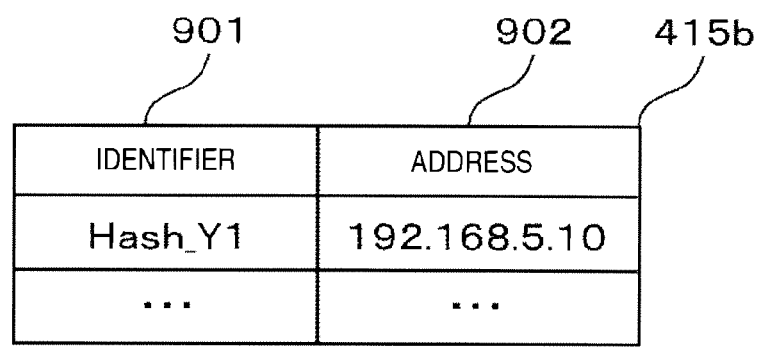
FIG. 9 shows an example of a table provided in switches and in which IP addresses of server devices of distribution destination are registered.
Figure 10:
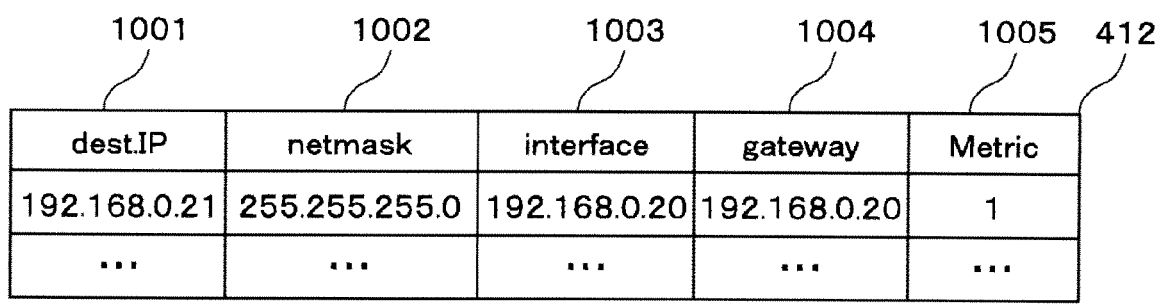
FIG. 10 shows an example of a routing table provided in switches and used when routing to a server device or a gateway device of a distribution destination is made.
Figure 11:
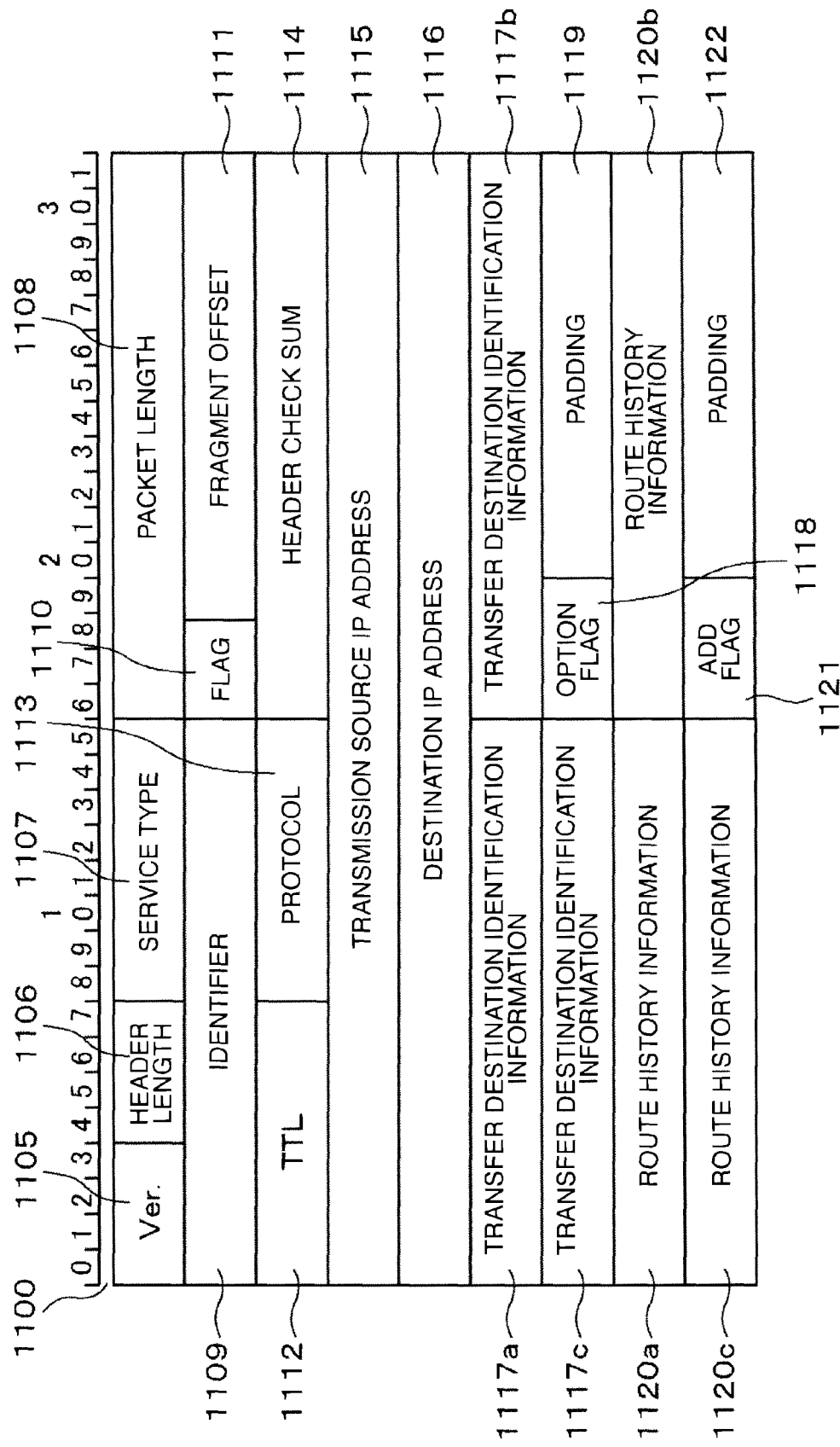
FIG. 11 shows an example of a header format of IP datagram.
Figures 20, 21:
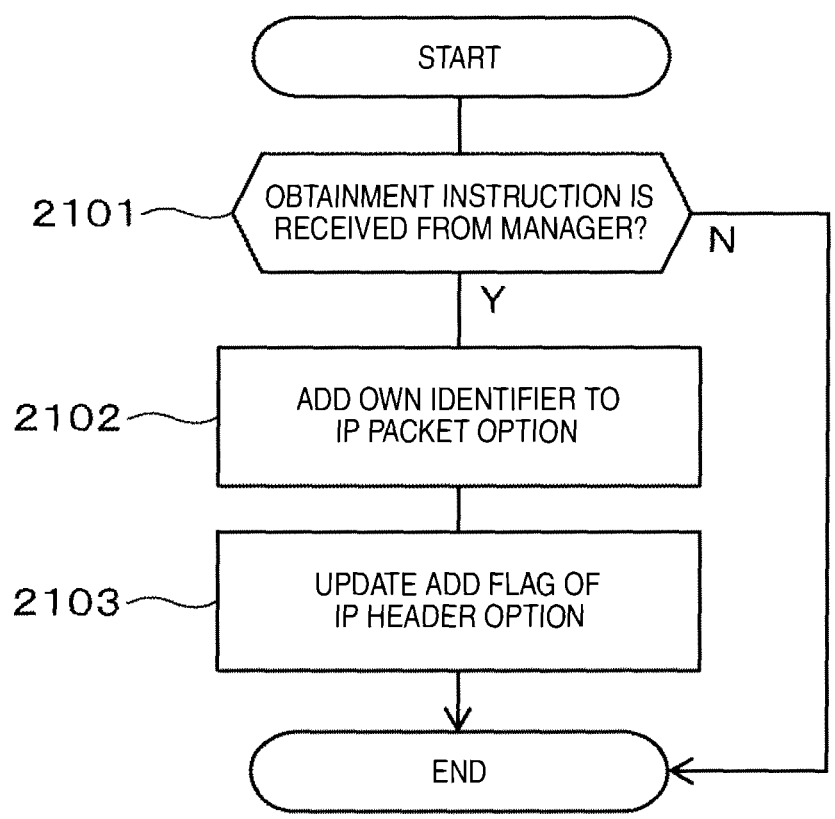
FIG. 20 shows an example of a table provided in a gateway device and in which IP addresses of server devices of distribution destination are registered.
FIG. 21 shows a flow chart showing an example of processing performed in a gateway device or switch when route history information is added to header of IP datagram.

FIG. 6 shows information of the dispersion rule provided in the FW 101, the gateway device 103, the switch 102 at front stage, the switch 104 at back stage and the server 105. FIG. 7 shows the terminal identification information provided in the FW 101. FIG. 8 shows the distribution destination server information provided in the switch 102 at front stage. FIG. 9 shows the distribution destination server information provided in the switch 104 at back stage. FIG. 20 shows the distribution destination server information provided in the gateway device 103. FIG. 10 shows the routing table provided in the switch 102 at front stage. FIG. 11 shows IP datagram header format. The figures are described hereinafter.

FIG. 6 shows an example of the dispersion rule 600 provided in the FW 101, the gateway device 103, the switch 102 at front stage, the switch 104 at back stage and the server 105. Further, the dispersion rule 600 is the same as the dispersion rules 213, 313, 414 and 514 shown in FIGS. 2, 3, 4 and 5, respectively.

For example, the dispersion rule 600 is used to transmit the dispersion rule 511 provided in the server 105 to the FW 101, the switches 102 and 104 at front and back stages and the gateway device 103 to be stored in the memory 207 of the FW 101, the memory 307 of the gateway device 103 and the memories 406 of the switches 102 and 104 at front and back stages. The FW 101 and the gateway device 103 use the dispersion rule to grasp the server 105 in which a request received from the client 100 is dispersed and transfer the request to the server 105 or the gateway device 103 (intended network) intended upon transfer of the request.

Classification column 601 of the dispersion rule 600 stores therein classification information of application destination nodes of the dispersion rule. Dispersion rule column 602 stores therein rule information for deciding how data is dispersed among the application destination nodes stored in the classification column 601. Level column 603 stores therein level information indicating which level the node is positioned in the computer system at. Information provided in the server 105 and the gateway device 103 as the dispersion rule among devices is inputted by a manager in advance.

FIG. 7 shows an example of the terminal identification information provided in the FW 101. The terminal identification information 214 is used to recognize terminal classification of the client 100 as compared with UserAgent header of HTTP header field when the HTTP analysis processing 210 analyzes HTTP request in the FW 101.

The FW 101 having the terminal identification information 214 adds the dispersion rule to header of IP datagram (hereinafter also referred to as IP packets) upon transfer of request when the terminal identification information 214 is identical with the terminal classification of the client 100. Terminal identification information column 701 stores therein information for identifying a terminal of the client 100.

FIG. 8 shows an example of the distribution destination server information 415a provided in the switch 102 at front stage. The distribution destination server information 415a is used to decide a transfer destination address as compared with an identifier added to header option of IP packets (hereinafter also referred to as IP header option) when designation information is added to IP header option received from the FW 101 in the switch 102 at front stage. Identifier column 801 of the distribution destination server information 415a stores therein identifiers obtained by application of the dispersion rule. Address column 802 stores therein addresses of the gateway devices 103 identified by the identifiers 801.

FIG. 9 shows an example of the distribution destination server information 415b provided in the switch 104 at back stage. The configuration of the switch 102 at front stage is the same as that of the switch 104 at back stage. However, the switch 102 at front stage is positioned between the FW 101 and the gateway device 103 whereas the switch 104 at back stage is positioned between the gateway device 103 and the server 105. Accordingly, the distribution destination server information 415b has setting contents different from the distribution destination server information 415a. Description in columns of the distribution destination server information 415b is the same as FIG. 8.

FIG. 20 shows an example of the distribution destination server information 415c provided in the gateway device 103. Description in columns of the distribution destination server information 415c is the same as FIG. 8.

FIG. 10 shows an example of the routing table provided in the switch 102 at front stage. The routing table 412 stores therein information referred to when the routing processing 411 of the switch 102 at front stage transfers packets. The routing table 412 describes rules for deciding a network interface to which received packets are transferred with reference to a destination address of the received packets.

Dest.IP column 1001 of the routing table 412 stores therein addresses to be controlled. Netmask column 1002 stores therein net mask values of addresses described in the dest.IP column 1001. Interface column 1003 stores therein addresses of the NW I/F of transmission destination of packets. Gateway column 1004 stores therein gateway address of transmission packets. Metric column 1005 stores therein metric value. The switch 104 at back stage also has the same table as FIG. 10.

Figure 22A:
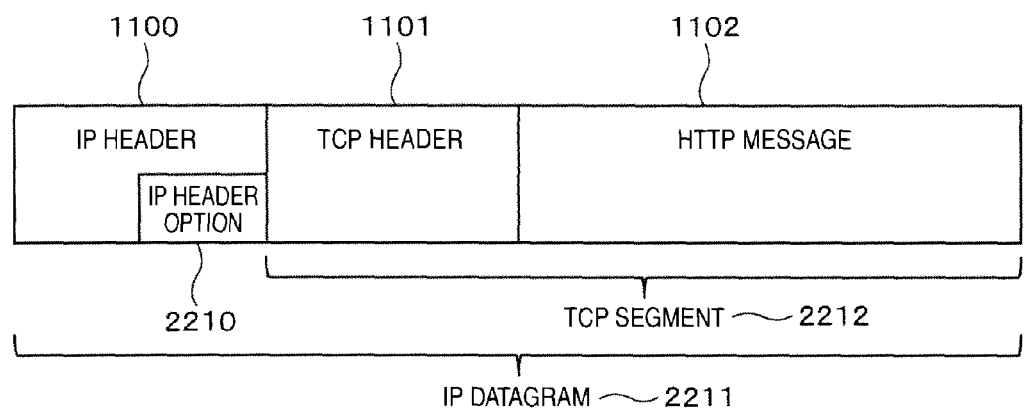
FIG. 22A shows an example of structure of IP datagram.

FIG. 22A shows an example of structure of the IP datagram. The IP datagram 2211 includes IP header 1100 and TCP segment 2212. The TCP segment 2212 includes TCP header 1101 and HTTP message 1102. IP header option 2210 is contained in part of the IP header 1100.

Figure 22B:
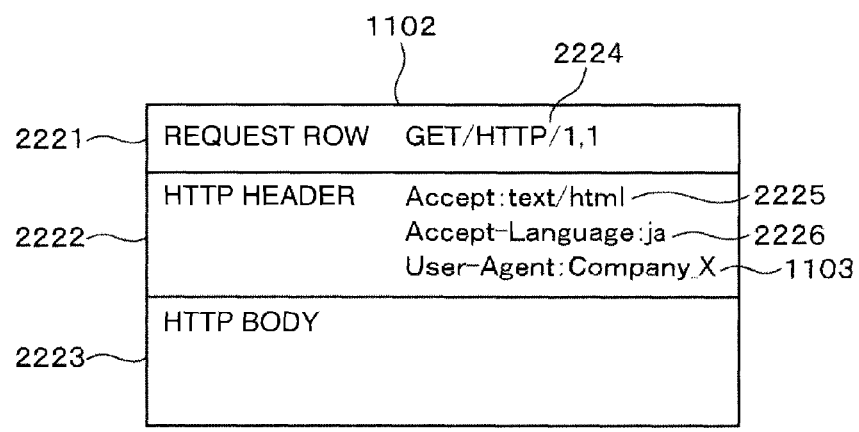
FIG. 22B shows an example of structure of HTTP message.

FIG. 22B shows an example of structure of the HTTP message 1102. The HTTP message 1102 includes request row 2221, HTTP header 2222 and HTTP body 2223. However, it is not indispensable that the HTTP message 1102 includes the HTTP header 2222 and the HTTP body 2223.

Request row 2221 includes method and resource requested by the client 100 and version 2224 of HTTP. The HTTP header 2222 includes one or more fields. In this example, the HTTP header 2222 includes three fields containing Accept header 2225, Accept-Language header 2226 and User-Agent header 1103.

The accept header 2225 can designate a contents type which can be received by the client 100. The Accept-Language header 2226 can designate a language of message to which the server 105 responds. The User-Agent header 1103 can designate HTTP installed software name of the client 100.

FIG. 11 shows an example of format of IP datagram header (hereinafter abbreviated to IP header) 1100 in case where the FW 101 and the gateway device 103 add identifier of transfer destination to IP packet header of transfer packets. Divisions of scale described in upper part of the table of FIG. 11 represent bit number and each row includes 32 bits.

Ver. 1105 indicates version of IP. Header length 1106 indicates length of IP header by the unit of 4 octets (32 bits). Service type 1107 indicates the quality of service represented by priority degree of data and is designated by application or user.

Packet length 1108 indicates the total length containing IP header 1100 and data part following it by the octet unit. Identifier 1109 is to identify each of plural subdivided IP datagrams 1100 upon reorganization. Flag 1110 and fragment offset 1111 indicate flag for controlling subdivision of IP datagram and offset value representing first position of fragment in 8-octet unit, respectively.

TTL (Time to Live) 1112 represents maximum time that IP datagram 1100 can live in network. Protocol 1113 represents information for identifying high-rank protocol of IP. Header check sum 1114 represents check sum for guaranteeing exactness of IP header. Transmission source IP address 1115 contained in UserAgent header 1103 represents transmission source address of IP datagram 1100 and destination IP address 1116 represents transmission destination address of IP datagram 1100.

IP header option (or abbreviated to option part) 2210 shown in lines 6 to 9 of FIG. 11 is described in detail.

Transfer destination identification information 1117a to 1117c represents identifier of transfer destination which is added to IP datagram by the FW 101 and the gateway device 103 and its length is variable. In FIG. 11, three transfer destinations are stored.

Option flag 1118 is a flag for distinguishing transfer destination identifier added to header of IP datagram 1100 by the FW 101 and the gateway device 103. Paddings 1119 and 1122 are data for adjusting so that the header of IP datagram is ended at boundary of 32 bits.

Route history information 1120a to 1120c represents identifiers indicating whether request from the client 100 passes through the gateway device 103, the switch 102 at front stage or the like until the request reaches the server 105 and its length is variable. In FIG. 11, three pieces of route history information are stored. ADD flag 1121 is a flag showing that route history information is added.

(Description of Each Processing)

Outline of processing in the embodiment is described. The server 105 transmits the dispersion rule 600 shown in FIG. 6 to the FW 101, the switch 102 at front stage, the gateway device 103 and the switch 104 at back stage in advance (FIG. 14) and the transmitted dispersion rule 600 is stored in the respective memories (FIG. 15).

Figure 12:
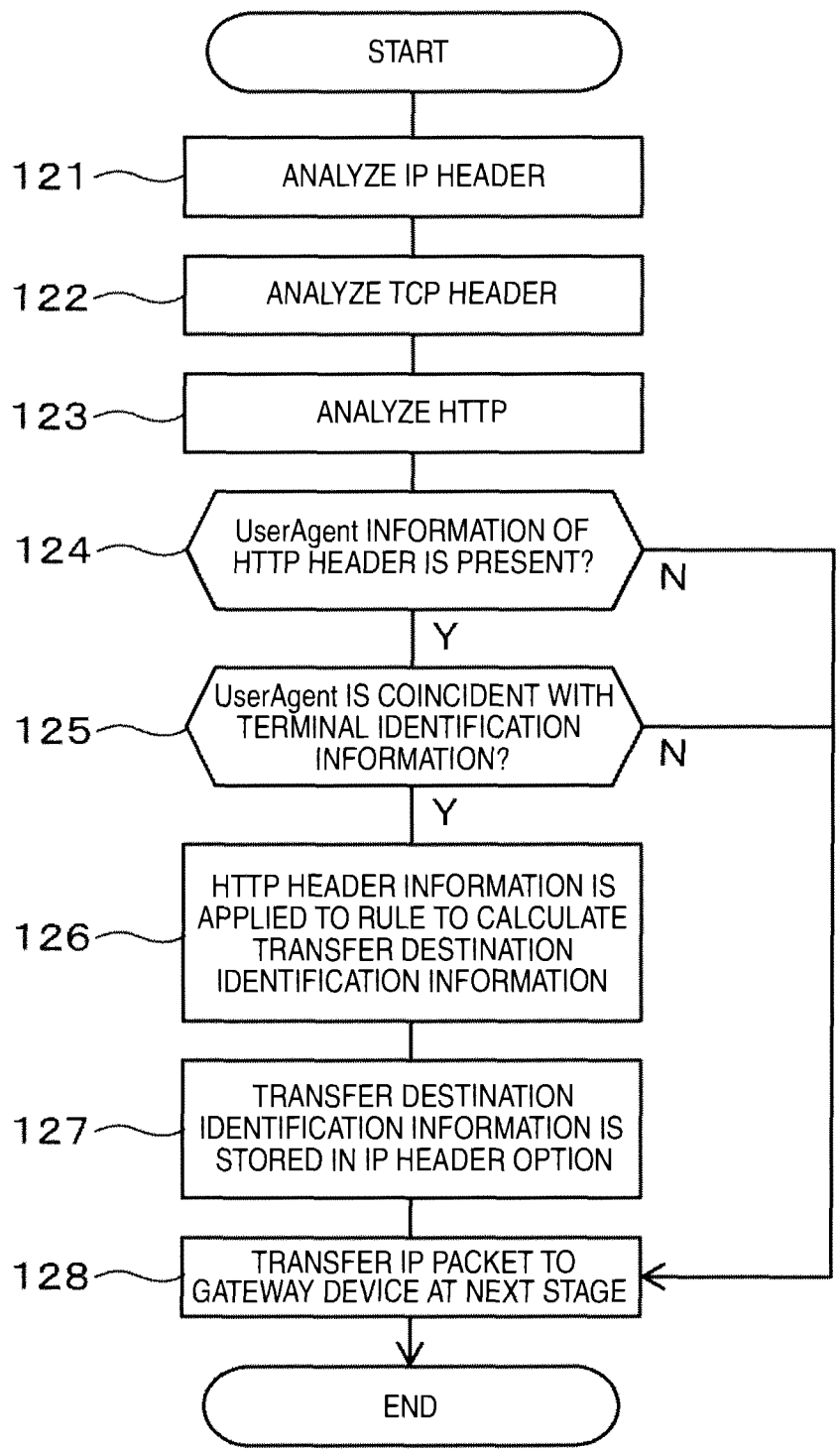
FIG. 12 shows a flow chart showing an example of processing performed in a firewall device when a request is transferred to a device at back stage.
Figure 13:
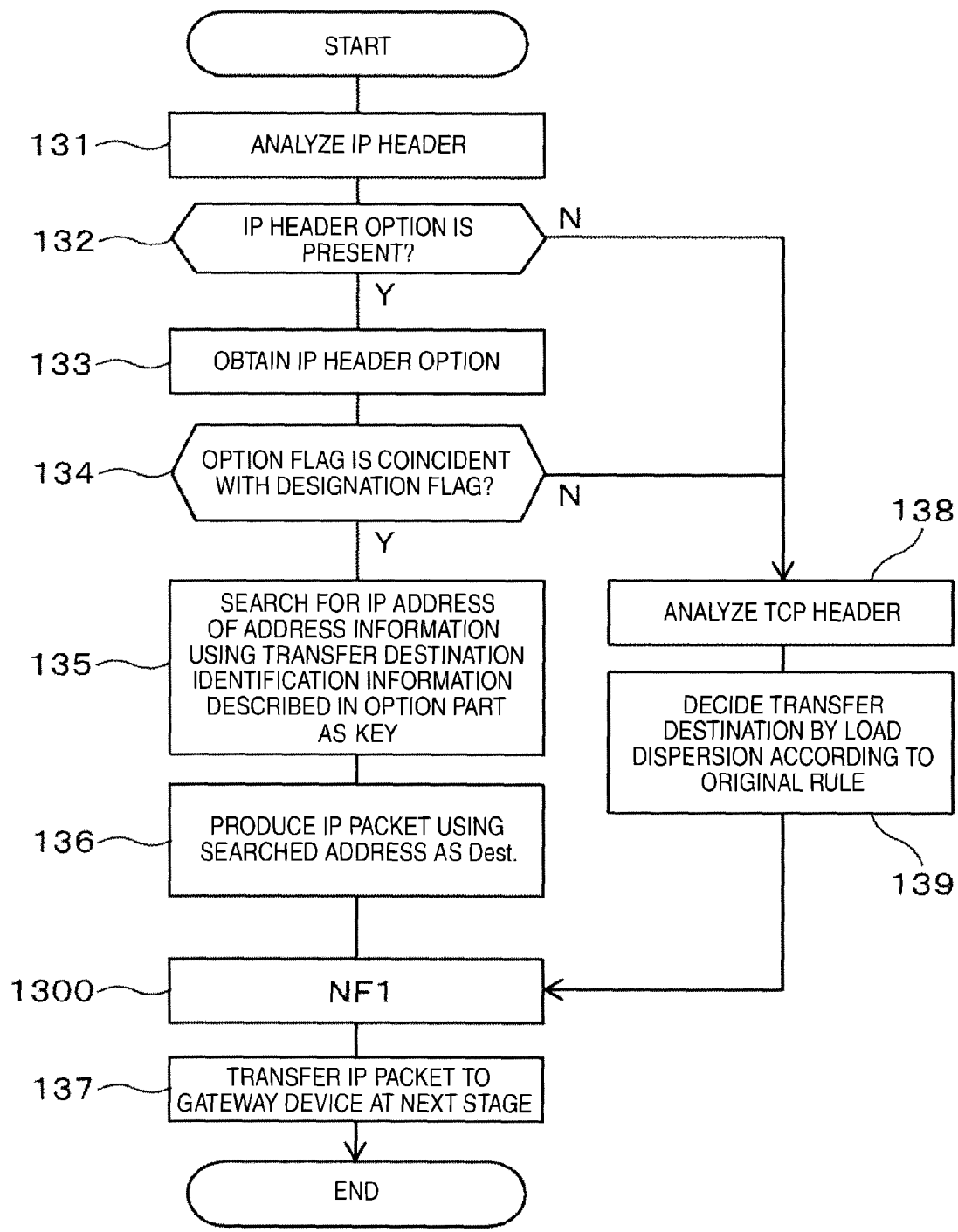
FIG. 13 shows a flow chart showing an example of processing performed in a switch when a request is transferred to a device at back stage.

The FW 101 which has received a request from the client 100 performs transfer processing (FIG. 12) and the switch 102 at front stage which has received the request from the FW 101 performs transfer processing (FIG. 13). The gateway device 103 which has received the request from the switch 102 at front stage performs transfer processing (FIG. 16) and the switch 104 at back stage which has received the request from the gateway device 103 performs transfer processing to the server 105 (FIG. 13). In the switch 102 at front stage, the gateway device 103 and the switch 104 at back stage, the route history information is added to the header of IP datagram (FIG. 21).

FIG. 12 is a flow chart showing an example of the transfer processing at the time that a request is received from the client 100 in the relay processing 211, the HTTP analysis processing 210 and the packet option addition processing 212 of the FW 101. In the relay processing 211, the request is received from the client 100. Thereafter, the analysis processing of IP header 1100 of FIG. 11 is performed (step 121). In the relay processing 211, the analysis processing of TCP header 1101 is performed (step 122). In the HTTP analysis processing 210, analysis processing of HTTP header 1102 is performed after step 122 (step 123).

In the HTTP analysis processing 210, it is confirmed whether UserAgent header 1103 of HTTP header field 1102 is present or not. When the UserAgent header 1103 of the HTTP header field 1102 is present, processing in step 125 is performed. On the other hand, when the UserAgent header 1103 of the HTTP header field 1102 is not present, processing in step 128 is performed (step 124).

In step 124, when the UserAgent header 1103 of the HTTP header field 1102 is present, the HTTP analysis processing 210 of the FW 101 compares information registered in the terminal identification information column 701 of the terminal identification information 214 with the UserAgent header information 1103 to confirm whether both of information are coincident or not. When both are coincident, processing in step 126 is performed. When both are not coincident, processing in step 128 is performed (step 125).

In step 125, when information of the UserAgent header 1103 of the HTTP header field is coincident with the information registered in the terminal identification information column 701 of the terminal identification information 214, the packet option addition processing 212 applies information of the UserAgent header 1103 to rule registered in pertinent dispersion rule column 602 of pertinent classification column 601 of the dispersion rule 213 to calculate option identifier (step 126).

For example, the rule described in the dispersion rule column 602 is the hash function and a hash value obtained when the information of the UserAgent header 1103 is applied to the hash function is option identifier. Further, information described in the level column 603 is the number of levels of device when couplement or connection of network is traced from the FW 101.

Next, in the packet option addition processing 212, the transfer destination identification information 1117 calculated in step 126 is stored in the option part 2210 of the IP header 1100 in order of level (in ascending order of information described in the level column 603). Similarly, information is also stored in the option flag 1118 of the IP header (step 127). In the relay processing 211, IP packets are transferred to the switch 102 at front stage and processing is ended (step 128).

FIG. 13 is a flow chart showing an example of the transfer processing at the time that a request is received from the FW 101 in the routing processing 411, the L2/L3 analysis processing and the L2 packet option processing of the switch 102 at front stage.

In the L2/L3 analysis processing 410, when the request is transferred from the FW 101, the IP header is analyzed (step 131). Next, the L2/L3 analysis processing 410 confirms whether the IP header option 2210 is present or not and when it is present, processing in step 133 is performed. On the other hand, when the IP header option 2210 is not present, processing in step 138 is performed (step 132). In step 132, when the IP header option 2210 is present, the L2 packet option processing 413 obtains the IP header option 2210 (step 133).

Next, in the L2 packet option processing 413, it is confirmed whether information of the option flag 1118 of the IP header option is coincident with the designation flag or not. When the information of the option flag is coincident with the designation flag, processing in step 135 is performed and when both are not coincident, processing in step 138 is performed (step 134).

In step 134, when information of the option flag 1118 is coincident with the designation flag, the L2 packet option processing 413 obtains the transfer destination identification information 1117a positioned first in the IP header option 2210 and searches the distribution destination server information 415 using the transfer destination identification information 1117a as a key to obtain an address 802 coincident with the identifier in the identifier column 801 of the distribution destination server information 415 (step 135).

In the L2 packet option processing 413, the address obtained in step 135 is used as the destination address 1116 to produce IP packets. Further, at this time, the transfer destination identification information 1117a of the IP header option 2210 referred to in step 135 is deleted (step 136).

Next, in the L2 packet option processing 413, processing of the flow chart shown in FIG. 21 is performed and the route history information 1120a is added to the IP header option 2210 (step 1300). "NF1" in step 1300 means "addition of route history information". "NF1" in FIGS. 16 and 19 described later is also the same. In the routing processing 411, IP packets 1100 produced in step 136 are transferred to the gateway device 103 of the destination address and processing is ended (step 137).

In step 132, when the IP header option 2210 is not present or in step 134, when the information of the option flag 1118 is not coincident with the designation flag, the routing processing 411 analyzes the TCP header 1101 (step 138). Next, in the routing processing 411, in order to transfer packets to the NW I/F described in pertinent interface column 1003 of dest.IP column 1001 pertinent to the received request in accordance with contents of the routing table 412, IP packets 1100 are produced (step 139).

Moreover, the flow chart shown in FIG. 13 shows the flow of processing of the switch 102 at front stage, although the flow chart of the switch 104 at back stage is the same as that of FIG. 13 except that transfer destination is changed from the gateway device 103 to the server 105 and the distribution destination server information 415b shown in FIG. 9 is used instead of the distribution destination server information 415a shown in FIG. 8.

FIG. 21 is a flow chart showing an example of processing of adding the route history information to the header of the IP datagram by the gateway device 103, the switch 102 at front stage or the switch 104 at back stage. Processing performed by the gateway device 103, switch 102 at front stage and the switch 104 at back stage is the same and accordingly processing performed by the L2 packet option processing 312 of the gateway device 103 is described.

The L2 packet option processing 312 of the gateway device 103 judges whether or not a history obtainment instruction is issued from a manager. When the instruction is issued, processing in step 2102 is performed and when the instruction is not issued, processing is ended (step 2101). When it is judged that the instruction is issued in step 2101, the L2 packet option processing 312 adds its own node identifier to the IP packet option 2210 as the route history information 1120a.

For example, the own node identifier is the IP address of its own node masked by a fixed numeral value. Next, the L2 packet option processing 312 updates the ADD flag 1121 of the IP header option 2210 and processing is ended. For example, the ADD flag 1121 is incremented (step 2103).

Figure 14:
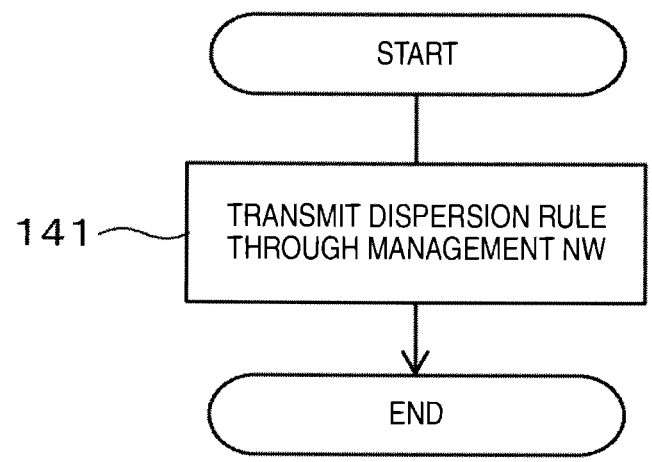
FIG. 14 shows a flow chart showing an example of processing performed in a server device when dispersion rule is transmitted to firewall device, gateway device or switch through a management network.
Figure 15:
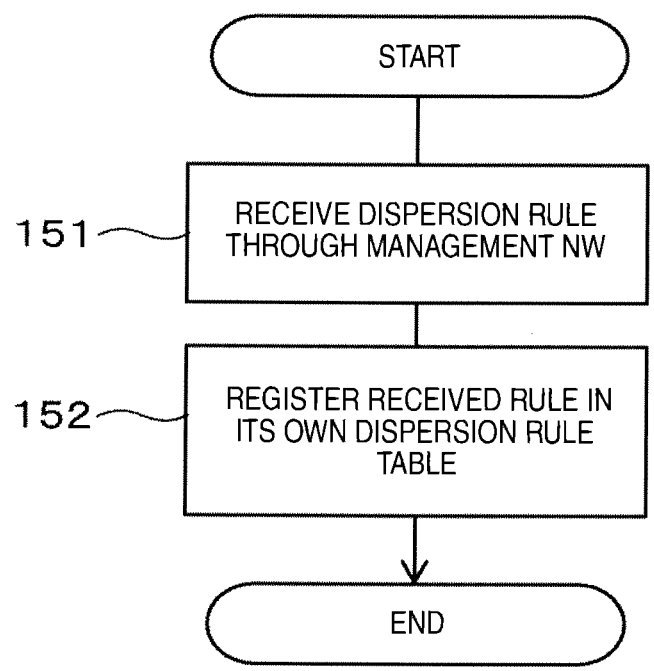
FIG. 15 shows a flow chart showing an example of processing performed in a firewall device, a gateway device or a switch when dispersion rule is received from a server device through the management network.

FIG. 14 is a flow chart showing an example of processing of transmitting the dispersion rule to the switch 102 at front stage, the switch 104 at back stage, the gateway device 103 and the FW 101 by the server 105 having the dispersion rule 600. Here, there is shown the flow chart showing an example of processing of transmitting the dispersion rule to the FW 101 and the gateway device 103 by the server 105. The server processing 510 of the server 105 transmits the dispersion rule 511 to the FW 101 and the gateway device 103 through the network 208 coupled to the NW I/F 503 (step 141).

FIG. 15 is a flow chart showing an example of processing of receiving the dispersion rule 600 from the server 105 in the gateway device 103, the switch 102 at front stage and the switch 104 at back stage. Receiving processing of any device is the same and accordingly receiving flow chart for the FW 101 is described.

The packet option addition processing 212 of the FW 101 receives the dispersion rule from the server 105 through the NW I/F 205 (step 151). Next, the packet option addition processing 212 registers the received information in the dispersion rule 213 of the memory 207 and processing is ended (step 152).

Figure 16:
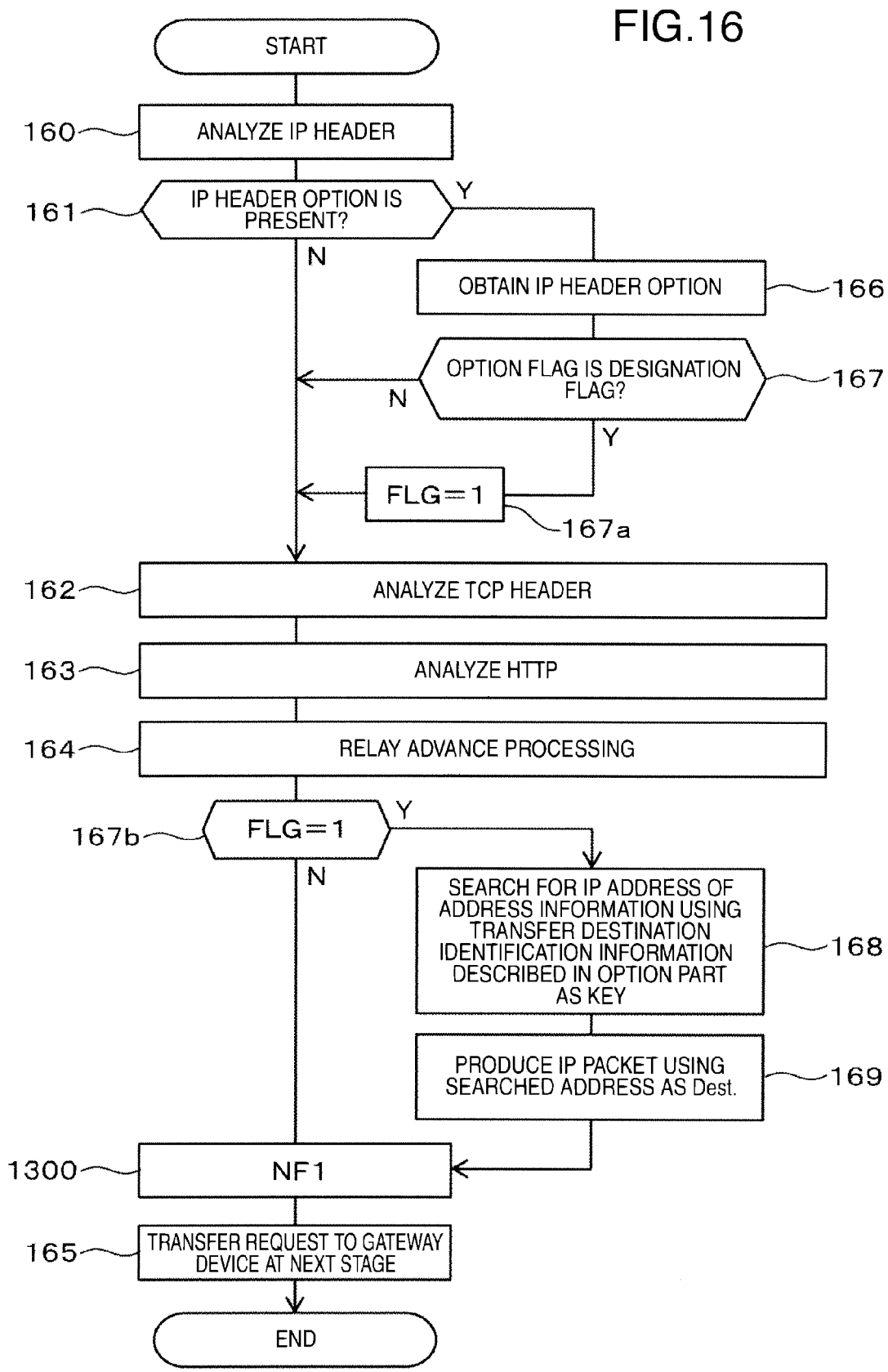
FIG. 16 shows a flow chart showing an example of processing performed in a gateway device when a request is transferred to a switch at back stage.

FIG. 16 is a flow chart showing an example of the transfer processing at the time that the relay processing 311, the HTTP analysis processing 311 and the L2 packet option processing 312 of the gateway device 103 receive the request from the switch 102 at front stage.

In the L2 packet option processing 312 of the gateway device 103, when the request is transferred from the switch 102 at front stage, the IP header 1100 is analyzed (step 160).

Next, the L2 packet option processing 312 confirms whether the IP header option 2210 is present or not and when the IP header option 2210 is present, processing in step 166 is performed. On the other hand, when the IP header option 2210 is not present, processing in step 162 is performed (step 161). In step 161, when the IP header option 2210 is present, the L2 packet option processing 312 obtains the IP header option 2210 (step 166).

Next, the L2 packet option processing 312 confirms whether information of the option flag 1118 of the IP header option 2210 is coincident with the designation flag or not (step 167) and when the information of the option flag 1118 is coincident with the designation flag, "1" is set to flag FLG (step 167a).

Then, the relay processing 311 analyzes the TCP header 1101 (step 162). After step 162, the HTTP analysis processing 310 analyzes the HTTP header 1102 (step 163). The relay processing 311 performs advance processing for relay in response to result of step 163 (step 164).

In step 167, when the flag FLG has been set to "1" (step 167b), the L2 packet option processing 312 obtains the transfer destination identification information 1117 of the IP header option 2210 and searches the distribution destination server information 314 using the transfer destination identification information 1117 as a key to obtain the address 2002 coincident with the identification column 2001 of the distribution destination server information 415c (step 168).

The L2 packet option processing 312 produces the IP packets 1100 using the address obtained in step 168 as the destination address 1116. Further, at this time, the transfer destination identification information 1117 of the IP header option 2210 referred to in step 168 is deleted (step 169). When the IP header option 2210 is not present in step 161 or when the option flag 1118 is not coincident in step 167, the L2 packet option processing 312 performs processing of the flow chart shown in FIG. 21 after processing of step 164 and adds the route history information 1120b to the IP header option 2210.

Further, even after execution of step 169, the L2 packet option processing 312 performs processing of the flow chart shown in FIG. 21 similarly and adds the route history information 1120b to the IP header option 2210 (step 1300). The relay processing 311 transfers the request to the switch 104 at back stage and is ended (step 165).

In the method of the embodiment, the FW 101 gives identification information of the gateway device 103 and the server 105 of distribution destination to IP packet option on the basis of the dispersion rule of the gateway device 103 and the server 105, so that routing in IP layer can be made in the switches 102 and 104 at front and back stages existing on the way of the route of the network.

Further, when the client 100 accesses the server 105, the identifier of the node in which the transfer processing is performed in the gateway device 103 and the switch 102 at front stage is added to the option 2210 of IP packets 1100 as the route history information 2210, so that the network route from the client 100 to the server 105 can be grasped.

In the embodiment, the FW 101 performs routing to the gateway device 103 and the server 105, although the gateway device 103 may perform the same routing as the FW 101.

Further, in case of the computer system configuration as shown in FIG. 1 where the switch 104 at back stage positioned behind the gateway device 103 is not dispersed, packets may be normally transferred in the relay processing flow chart (FIG. 16) of the gateway device 103 irrespective of presence or absence of the IP header option 2210.

In the embodiment, processing based on the UserAgent header 1103 of the HTTP request is performed by the specific gateway device 103 and the server 105, although request of the client 100 can be delivered to the server 105 through the network route intended by the manager by designating the dispersion rule by the manager directly.

Embodiment 2

As an example of the system constituted of plural servers utilizing structure in which data is stored in semiconductor memory to make response, there is a mail box server. For example, user data of the mail box are dispersedly stored in the memory of this system to improve response performance.

In case of such a system, when data is stored in the mail box server, the gateway device positioned before the mail box server transmits data to the mail box server without necessity of grasping which of plural mail box servers data is stored in. This reason is that there is provided the function that a request is transferred to a proper server (server having user data) among the mail box servers.

In the embodiment 2, there is described the method of routing a request to a proper server without transfer in the mail box server in the above system. This system has the same configuration (FIG. 1) as shown in the embodiment 1 and the mail box server corresponds to the server 105. The mail box server performs processing of storing the request in user's mail box data after the request is received. In the following description, different point from the embodiment 1 is described mainly.

Figure 17:
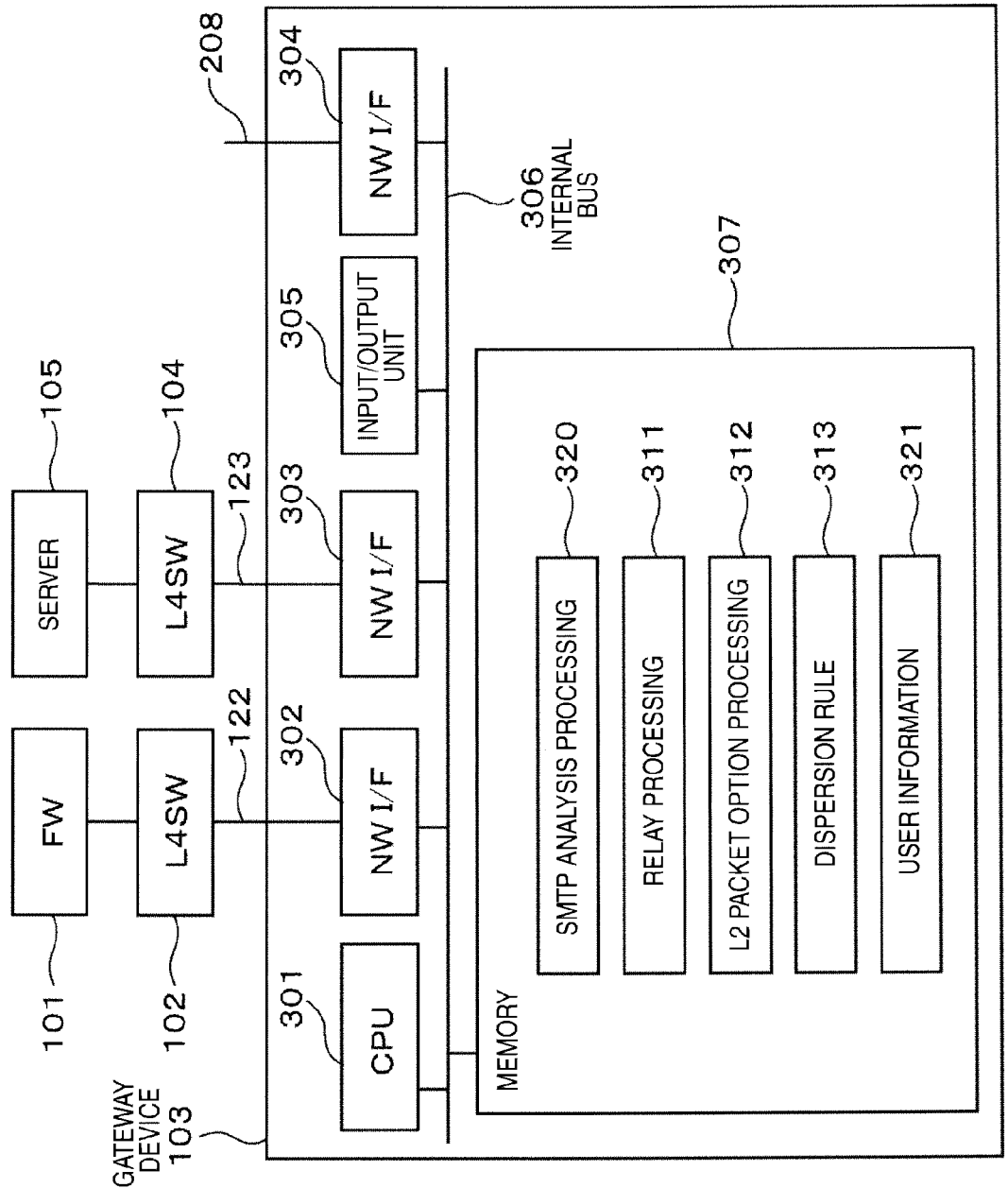
FIG. 17 shows a block diagram schematically illustrating a gateway device.

FIG. 17 is a diagram schematically illustrating an example in which programs for realizing SMTP analysis processing 320 and user information 321 are added newly instead of programs for realizing the HTTP analysis processing 310 and the distribution destination server information 314 in the configuration example of the gateway device 103 shown in FIG. 3. The SMTP analysis processing 320 analyzes an SMTP (Simple Mail Transfer Protocol) request (request for transferring an electronic mail).

FIG. 22A shows IP datagram structure of HTTP message and SMTP message also has the same structure. The SMTP message includes SMTP header and SMTP body. User information 321 stores therein user information to be controlled.

Figure 18:
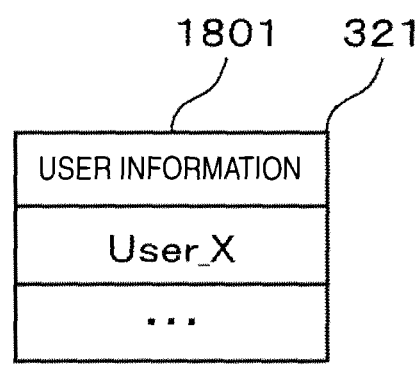
FIG. 18 shows an example of a table provided in a gateway device and in which user information for identifying mail data is registered.

FIG. 18 shows an example of user information provided in the gateway device 103. User information column 1801 of the user information 321 stores therein user ID subjected to routing control.

Figure 19:
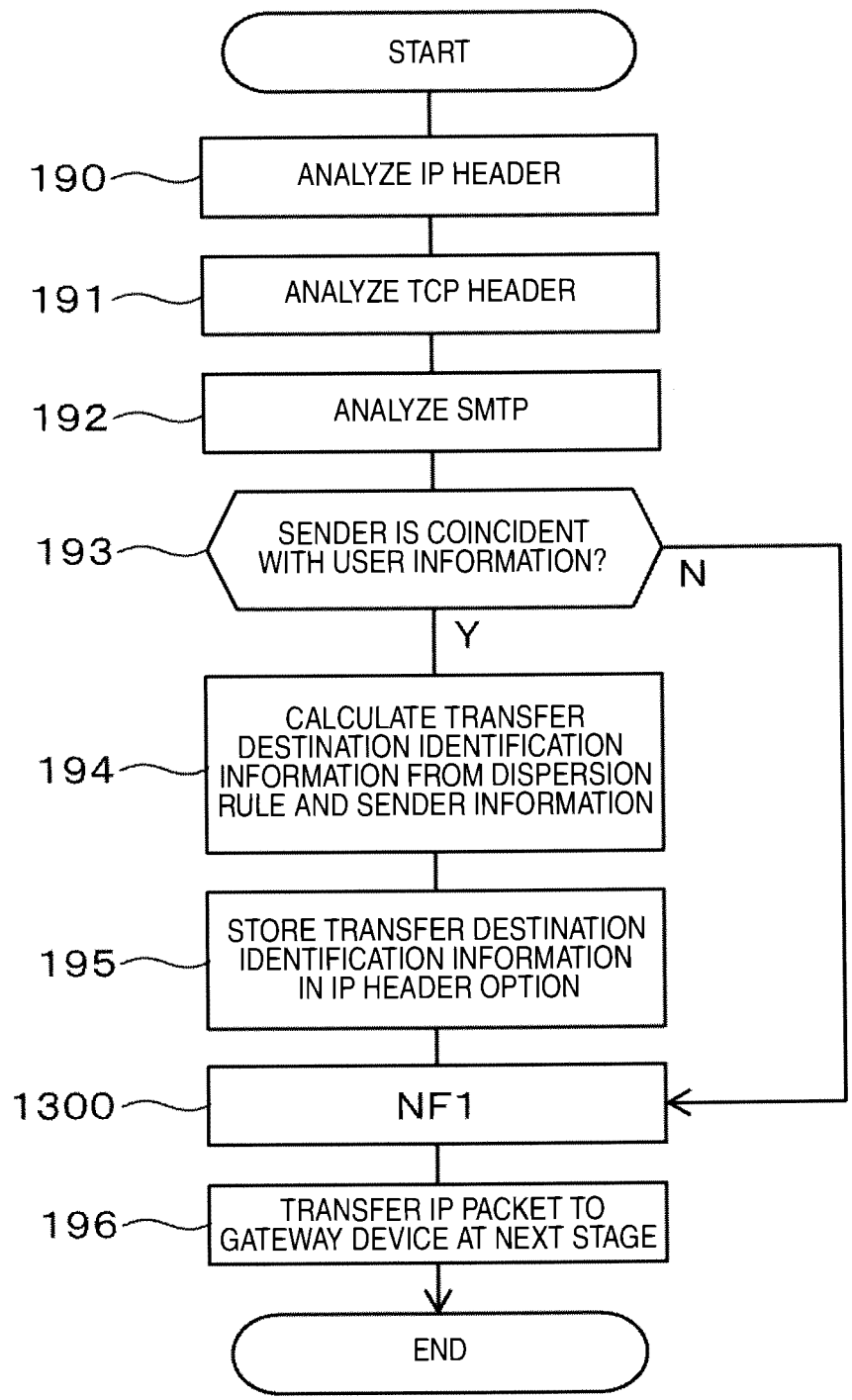
FIG. 19 shows a flow chart showing an example of processing performed in a gateway device when mail data is transferred.

FIG. 19 is a flow chart showing an example of processing at the time that the SMTP analysis processing 320, relay processing 311 and L2 packet option processing 312 of the gateway device 103 receive a mail request.

The relay processing 311 of the gateway device 103 analyzes the IP header 1100 of the request received from the client 100 (step 190). Next, the relay processing 311 analyzes the TCP header 1101 of the received request (step 191). The SMTP analysis processing 320 analyzes the SMTP header of the received request (step 192).

Next, the SMTP analysis processing 320 compares information of a sender (for example, Sender tag) with user ID described in the user information column 1801 of the user information 321. When both are coincident, processing in step 194 is performed and when both are not coincident, processing in step 1300 is performed (step 193). In step 193, when the user ID is coincident with the sender information, the L2 packet option processing 312 refers to the dispersion rule 602 corresponding to pertinent column 601 of the dispersion rule 313 to calculate the transfer destination identification information 1117 in accordance with the rule (step 194).

Next, the L2 packet option processing 312 stores the transfer destination identification information 1117 calculated in step 194 in the IP header option part 2210. Similarly, information is also stored in the option flag 1118 of the IP header 1100 (step 195).

Next, the L2 packet option processing 312 performs processing of the flow chart shown in FIG. 21 and adds the route history information 1120a to the IP header option 2210 (step 1300). The relay processing 311 transfers the IP packet 1100 to the switch 102 at front stage and processing is ended (step 196).

In the embodiment, when storing processing of mail data is performed by the specific mail box server, the request can be transmitted to the mail box server in which mail box data of the user is stored without tracing excessive route by the routing.

Although the present disclosure has been described with reference to example embodiments, those skilled in the art will recognize that various changes and modifications may be made in form and detail without departing from the spirit and scope of the claimed subject matter.

The invention claimed is:

1. A node in a network system, the node being coupled with other nodes, each node being one of a gateway device or a switch disposed between clients and servers of the network system,
the node being configured to send, according to a protocol processing, to another one of the nodes a message prepared;
the node being configured to:
process a first datagram including the message and one or more destination identification identifiers, to generate a second datagram including the message and being addressed to a second node by referring to one of the one or more destination identification identifiers;
send out the datagram generated,
wherein the one or more destination identification identifiers are configured to be set in accordance with a predetermined rule; and
record in the second datagram an identifier of the node as a track record.

2. The node according to claim 1, wherein the one or more identification identifiers are set in an order of the one or more of the nodes through which the message travels.

3. The node according to claim 2, further configured to refer, in generating the second datagram, the identifier first positioned in the one or more destination identification identifiers.

4. The node according to claim 1, wherein each of the identification identifiers is set with information used for judging whether or not the one or more destination identification identifiers are referred to.

5. The node according to claim 1, further configured to set in the second datagram the one or more destination identification identifiers in the first datagram without the identifier having been referred to in the node.

6. The node according to claim 1, further configured to delete, in generating the second datagram, the identifier referred to in the node from the one or more destination identification identifiers of the first datagram.

7. The node according to claim 1, further configured to obtain the identifier to be referred to stored in a header option of the first datagram.

8. The node according to claim 1, further configured to record in the second datagram an identifier of the node as a track record even when the one or more destination identification identifiers are not referred to.

9. The node according to claim 1, further configured to record the identifier of the node as the track record in the header option of the datagram.

10. The node according to claim 1, further configured to add the identifier thereof to the one or more identifiers recorded in an order of one or more of the nodes through which the message has passed.

11. The node according to claim 1, further configured to refer to, in case of processing the first datagram to generate the second datagram, the one or more destination identification identifiers, in case of being designated to refer to the one or more destination identification identifiers in the node.

12. The node according to claim 1,
wherein in case that a number of the destination identification identifiers to be generated is plural, each of the destination identification identifiers is generated in accordance with respective rules different from each other.

13. The node according to claim 1, wherein the destination identification identifiers are generated during the protocol processing.

14. The node according to claim 1, wherein the node is configured to define another node by the protocol processing in case that the destination identification identifier has not been included in a header of the datagram.

15. A node in a network system, the node being coupled with other nodes, each node being one of a gateway device or a switch disposed between clients and servers of the network system,
the node being configured to send, according to a protocol processing, to another one of the nodes a message prepared;
the node being configured to:
process a first datagram including the message and one or more destination identification identifiers, to generate a second datagram including the message and being addressed to a second node by referring to one of the one or more destination identification identifiers;
send out the datagram generated,
wherein the one or more destination identification identifiers are configured to be set in accordance with predetermined rule,
wherein the predetermined rule comprises a dispersion rule.

* * * * *